(12) United States Patent
Yahav et al.

(10) Patent No.: US 8,102,426 B2
(45) Date of Patent: Jan. 24, 2012

(54) 3D VISION ON A CHIP

(75) Inventors: Giora Yahav, Haifa (IL); Gavriel Joseph Iddan, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 701 days.

(21) Appl. No.: 11/612,021

(22) Filed: Dec. 18, 2006

(65) Prior Publication Data

US 2007/0091175 A1    Apr. 26, 2007

Related U.S. Application Data

(62) Division of application No. 09/806,252, filed as application No. PCT/IL98/00476 on Sep. 28, 1998, now abandoned.

(51) Int. Cl.
*H04N 5/225* (2006.01)
*H04N 7/18* (2006.01)

(52) U.S. Cl. ................... 348/207.99; 348/135

(58) Field of Classification Search .................. 348/300, 348/301
See application file for complete search history.

(56) References Cited

U.S. PATENT DOCUMENTS

| | | |
|---|---|---|
| 4,490,036 A | 12/1984 | Anagnostopoulos |
| 4,689,487 A | 8/1987 | Nishiki et al. |
| 4,935,616 A | 6/1990 | Scott |
| 5,081,530 A | 1/1992 | Medina |

(Continued)

FOREIGN PATENT DOCUMENTS

EP    1118208    7/2001
(Continued)

OTHER PUBLICATIONS

Communication Pursuant to Article 94(3) EPC Dated May 14, 2009 From the European Patent Office Re.: Application No. 04077863.1.

(Continued)

*Primary Examiner* — Luong T Nguyen
(74) *Attorney, Agent, or Firm* — Vierra Magen Marcus & DeNiro LLP (57) ABSTRACT

A 3D camera for determining distances to regions in a scene comprising: a photosurface having a plurality of pixels each of which comprises a circuit having a light sensitive element that provides a current responsive to light incident thereon, wherein the circuit comprises, at least one amplifier inside the pixel, having an input and an output; at least one feedback capacitor separate from the light sensitive element and connected between the input and output of each of the at least one amplifier; at least one controllable connection through which current flows from the light sensitive element into the input of the at least one amplifier; a light source; and, a controller that, controls the light source to illuminate the scene with light, opens and closes the at least one controllable connection to gate or modulate current from the light sensitive element of a pixel in the photosurface responsive to the time dependence of the gating or modulation of the light, controls the at least one controllable connection to provide a current for correcting biases caused by at least one of background light or dark current, and determines a distance to a region imaged on the pixel responsive to an amount of charge integrated on the feedback capacitor responsive to the gated or modulated current and the corrected biases.

12 Claims, 7 Drawing Sheets

U.S. PATENT DOCUMENTS

| | | | |
|---|---|---|---|
| 5,329,312 | A | 7/1994 | Boisvert et al. |
| 5,345,266 | A | 9/1994 | Denyer |
| 5,488,415 | A | 1/1996 | Uno |
| 5,574,765 | A | 11/1996 | Hassler et al. |
| 5,751,189 | A * | 5/1998 | Shyu et al. ............ 330/9 |
| 5,790,191 | A * | 8/1998 | Zhang ............ 348/300 |
| 5,801,373 | A | 9/1998 | Oozu et al. |
| 5,844,588 | A * | 12/1998 | Anderson ............ 347/135 |
| 5,848,301 | A | 12/1998 | Nonaka |
| 5,969,754 | A * | 10/1999 | Zeman ............ 348/136 |
| 6,057,909 | A | 5/2000 | Yahav et al. |
| 6,157,409 | A | 12/2000 | Riches |
| 6,556,244 | B1 | 4/2003 | So et al. |
| 6,654,556 | B2 * | 11/2003 | Braun et al. ............ 396/96 |
| 6,697,111 | B1 | 2/2004 | Kozlowski et al. |

FOREIGN PATENT DOCUMENTS

| | | |
|---|---|---|
| JP | 2000-083260 | 3/2000 |
| WO | WO 97/01111 | 1/1997 |
| WO | WO 97/01112 | 1/1997 |
| WO | WO 97/01113 | 1/1997 |
| WO | WO 97/28558 | 8/1997 |
| WO | WO 99/40478 | 8/1999 |
| WO | WO 00/19705 | 4/2000 |

OTHER PUBLICATIONS

Christie, S. et al.; "Design and Development of a Multi-Detecting Two-Dimensional Ranging Sensor"; Measurement Science and Technology; vol. 6; pp. 1301-1308; 1995.

Yates, G. J. et al.; "Range-Gated Imaging for Near Field Target Identification"; SPIE; vol. 2869; pp. 374-385 ; 1997.

Denyer, P.; "Design and Use of Passive and Active Pixel CMOS Cameras"; SSCTC Workshop on CMOS Imaging Technology; pp. 1-18; Feb. 7, 1996.

Vietz, O. et al.; "Image Sensing with Programmable Offset Pixels for Increased Dynamic Range of More than 150 dB"; SPIE; vol. 2654; pp. 93-98 ; 1996.

Heanue, J.A. et al.; "CMOS Detector Readout Electronics for an Emission-Transmission Medical Imaging System"; IEEE Transactions on Nuclear Sciences; vol. 42, No. 4; pp. 1133-1138; Aug. 1995.

Schwarte, R. et al.; "A New Electrooptical Mixing and Correlating Sensor: Facilities and Applications of he Photonic Mixer Device (PMD)"; SPIE; vol. 3100; pp. 245-253 ; 1997.

Decker, S. et al.; "FPN Reduction Techniques in CMOS Imaging Arrays"; SSCTC Workshop on CMOS Imaging Technology; Feb. 7, 1996.

Patent Abstracts of Japan; Kazuji, W.; vol. 1997; No. 09; Sep. 30, 1997 & JP 09-116127; May 2, 1997.

* cited by examiner

3D VISION ON A CHIP

RELATED APPLICATIONS

This application is a divisional of U.S. application Ser. No. 09/806,252 which is a U.S. National Phase filing of PCT application PCT/IL98/00476, the disclosures of which are incorporated herein by reference.

FIELD OF THE INVENTION

The invention relates to cameras that provide measurements of distances to objects and parts of objects that they image and in particular to integrating functions of such cameras on a single chip.

BACKGROUND OF THE INVENTION

Three dimensional optical imaging systems, hereinafter referred to as "3D cameras", that are capable of providing distance measurements to objects and points on objects that they image, are used for many different applications. Among these applications are profile inspection of manufactured goods, CAD verification, robot vision, geographic surveying and imaging objects selectively as a function of distance.

Some 3D cameras provide simultaneous measurements to substantially all points of objects in a scene they image. Generally, these 3D cameras comprise a light source, such as a laser, which is pulsed or shuttered so that it provides pulses of light for illuminating a scene being imaged and a gated imaging system for imaging light from the light pulses that is reflected from objects in the scene. The gated imaging system comprises a camera having a photosensitive surface, hereinafter referred to as a "photosurface", such as a CCD camera, and a gating means for gating the camera open and closed, such as an optical shutter or a gated image intensifier. The reflected light is registered on pixels of the photosurface of the camera only if it reaches the camera when the camera is gated open.

To image a scene and determine distances from the camera to objects in the scene, the scene is generally illuminated with a train of light pulses radiated from the light source. For each radiated light pulse in the train, following an accurately determined delay from the time that the light pulse is radiated, the camera is gated open for a period of time hereinafter referred to as a "gate". Light from the light pulse that is reflected from an object in the scene is imaged on the photosurface of the camera if it reaches the camera during the gate. Since the time elapsed between radiating a light pulse and the gate that follows it is known, the time it took imaged light to travel from the light source to the reflecting object in the scene and back to the camera is known. The time elapsed is used to determine the distance to the object.

In some of these 3D cameras, only the timing between light pulses and gates is used to determine the distance from the 3D camera to a point in the scene imaged on a pixel of the photosurface of the 3D camera. In others, the amount of light registered by the pixel during the time that the camera is gated open is also used to determine the distance. The accuracy of measurements made with these 3D cameras is a function of the rise and fall times and jitter of the light pulses and their flatness, how fast the gating means can gate the camera open and closed.

A 3D camera using a pulsed source of illumination and a gated imaging system is described in "Design and Development of a Multi-detecting two Dimensional Ranging Sensor", Measurement Science and Technology 6 (September 1995), pages 1301-1308, by S. Christie, et al, and in "Range-gated Imaging for Near Field Target Identification", Yates et al, SPIE Vol. 2869, p 374-385 which are herein incorporated by reference.

Another 3D camera is described in U.S. Pat. No. 5,081,530 to Medina, which is incorporated herein by reference. A 3D camera described in this patent registers energy in a pulse of light reflected from a target that reaches the camera's imaging system during each gate of a pair of gates. Distance to a target is determined from the ratio of the difference between the amounts of energy registered during each of the two gates to the sum of the amounts of energy registered during each of the two gates.

A variation of a gated 3D camera is described in U.S. Pat. No. 4,935,616 to Scott, which is incorporated herein by reference. In this patent, a 3D camera is described in which a light source and imaging system, instead of being fully gated, are "modulated". In a preferred embodiment of the invention, the light source comprises a CW laser. The intensity of light radiated by the laser is modulated so that the intensity has an harmonically varying component. The sensitivity of the camera's imaging system to light is also harmonically modulated. When a target that is illuminated by the modulated laser light reflects some of the incident laser light, the reflected light has the same modulation as the laser light. However, modulation of the reflected light that reaches the imaging system from the target has a phase difference with respect to the modulation of the imaging system that depends upon the distance of the target from the camera. The intensity that the camera registers for the reflected light is a function of this phase difference. The registered intensity is used to determine the phase difference and thereby the distance of the target from the camera.

Other "gated" 3D cameras and examples of their uses are found in PCT Publications WO97/01111, WO97/01112, and WO97/01113 which are incorporated herein by reference.

An optical shutter suitable for use in 3D cameras is described in PCT patent application PCT/IL98/00060, by some of the same applicants as the applicants of the present application, the disclosure of which is incorporated herein by reference.

SUMMARY OF THE INVENTION

Some aspects of preferred embodiments of the present invention relate to providing an improved 3D camera wherein gating or modulating apparatus for the 3D camera is incorporated on a photosurface of the camera on which light detectors of the camera are also situated.

In accordance with one aspect of some preferred embodiments of the present invention, each pixel in the photosurface includes its own pixel circuit for gating the pixel on or off or for modulating the sensitivity of the pixel to incident light.

In some preferred embodiments of the present invention the same pixel circuit functions to gate the pixel on or off and to modulate the sensitivity of the pixel to incident light.

In some preferred embodiments of the present invention each pixel is gated on or off or modulated independently of other pixels. In other preferred embodiments of the present invention pixels on the photosurface are grouped into different pixel groups. The pixels belonging to a same pixel group are gated on or off or modulated substantially simultaneously. Pixel groups are gated on and off or modulated in different combinations and time sequences.

In some preferred embodiments of the present invention, pixels in different pixel groups are located in different regions of the photosurface. In some preferred embodiments of the present invention, the different regions are different parallel bands of pixels of the photosurface. In some preferred embodiments of the present invention, the different regions are substantially equal area regions of the photosurface.

Some aspects of preferred embodiments of the present invention relate to providing a photosurface that images a scene and provides measurements of distances to objects in the scene in a single frame.

Some aspects of preferred embodiments of the present invention relate to providing a photosurface that comprises pixels having outputs that are automatically corrected for biases and noise resulting from background light and dark current from a light sensitive element of the pixel.

In accordance with another aspect of some preferred embodiments of the present invention, a photosurface is provided comprising pixels, wherein each pixel includes a photodiode or other, preferably linear, light sensitive current source such as a photoresistor, or photogate, a charge accumulator, hereinafter referred to as, but not necessarily limited to an "integrator" and a variable connection. The photodiode is connected to the integration circuit via the variable connection. Preferably, the integrator comprises an amplifier, preferably, an operational amplifier with capacitive feedback.

In some preferred embodiments of the present invention the variable connection is a switch controllable to be either open or closed. When the photodiode is exposed to light to which it is sensitive and the pixel control switch is closed, a current flows into the integrator from the photodiode that is substantially proportional to the intensity of light incident on the photodiode. A charge, hereinafter referred to as a "photocharge", is accumulated by an integrator. The amount of photocharge accumulated is proportional to the integral over time of the intensity of light to which the photodiode is exposed during the time that the pixel control switch is closed. The integrated photocharge is used as a measure of the pixel response to the light to which it is exposed. The switch is said to gate the pixel on when the switch is closed and to gate the pixel off when the switch is open. The switch is hereinafter referred to as a "gate switch".

In some preferred embodiments of the present invention the variable connection operates to modulate the sensitivity of the pixel to incident light. In these preferred embodiments, the modulator is controllable, using methods known in the art, so that the magnitude of the resistance between the photodiode and the integrator across the modulator can be set to values within some range of values. When light is incident on the photodiode, the magnitude of photocurrent flowing between the photodiode and the storage capacitor is a function not only of the intensity of the incident light but also of the value of the modulator resistance. By controlling the value of the modulator resistance the amount of photocharge integrated by the integrator in a given period of time for a given intensity of incident light, and thereby the sensitivity of the pixel to incident light, is controlled or modulated. When operating in a modulating mode the variable connection is referred to as a "modulator".

In some preferred embodiments of the present invention the modulator modulates pixels so that pixel sensitivities vary harmonically. In some preferred embodiments of the present invention all pixels in a photosurface are modulated harmonically with a same frequency of modulation. In other preferred embodiments of the present invention different groups of pixels in a photosurface are modulated harmonically with different frequencies.

In some preferred embodiments of the present invention a variable connection is controllable to function only as a gate switch. In other preferred embodiments of the present invention it is controllable to function only as a modulator. In still other preferred embodiments of the present invention, it may be controllable to function as either a gate switch or a modulator. The pixel control switch is appropriately connected using methods known in the art, via a control line, to a controller that transmits control signals to operate the pixel control switch as a gating switch or as a modulator.

Gate switches and modulators of pixels in a photosurface can be controlled, in accordance with preferred embodiments of the present invention, to gate or modulate different combinations of pixels and to gate pixels and groups of pixels with different timing sequences. Similarly, pixel storage capacitors can be addressed and "read" in different combinations and in different timing sequences.

Preferably, the pixels are packed on the photosensitive surface with a pitch less than 50 microns. More preferably the pixels are packed with a pitch less than 30 microns. Preferably, the photosurface is produced using CMOS technology and the pixel control switch is a FET or MOSFET. Using CMOS technology, light sensitive photosurfaces comprising arrays of pixels suitable for visual imaging can be produced, wherein each pixel of the photosurface contains a light sensitive component such as a photo-diode and electronic switching, control and logic elements. For example, U.S. Pat. No. 5,345,266 describes a pixel comprising a photodiode and a transistor. Peter Denyer in a talk given at the 1996 SSCTC Workshop On CMOS Imaging Technology, Feb. 7, 1996, described a pixel comprising electronic elements that is on the order of 12 microns on a side and in which the photodiode occupies 60% the pixel area.

There is thus provided, in accordance with a preferred embodiment of the invention, a photosurface comprising a plurality of light sensitive pixels, wherein each pixel of the plurality of pixels comprises an electronic circuit, each of the circuits comprising:

a single light sensitive element that provides a current responsive to light incident thereon;

at least one charge accumulator separate from the light sensitive element; and at least one variable connection through which current flows from the light sensitive element into the integrator.

Preferably, the charge is accumulated on a capacitor. Preferably, the at least one charge accumulator comprises at least one amplifier, having an input and an output, the at least one capacitor being connected as a feedback capacitor of the amplifier, and wherein the at least one variable connection connects the light sensitive element to the input of the amplifier. Preferably, the amplifier is an operational amplifier.

Preferably the photosurface comprises at least one data bus and wherein the circuit comprises at least one address switch, which connects a data bus to an output of one of the at least one amplifiers, either directly or via another switch.

Preferably, the at least one variable connection comprises at least one gate switch. Preferably, the at least one capacitor comprises a single capacitor and the at least one gate switch comprises a single gate switch.

In preferred embodiments of the invention, such photosurfaces are used in 3D cameras. Preferably such cameras comprise a controller that gates each pixel in the photo surface on and off by controlling the gate switch associated with the capacitor to be closed or open. Preferably, the camera comprises a light source that radiates a plurality of light pulses, having a pulse width, that illuminate objects in the scene, wherein the controller gates pixels in the photosurface on or off at times coordinated with times at which light pulses of the plurality of light pulses are radiated.

In a preferred embodiment of the invention, the at least one capacitor comprises first and second capacitors connected as feedback capacitors respectively to first and second amplifiers to form first and second integrators; and the at least one gate switch comprises first and second gate switches, the first gate switch connecting the light sensitive element to the input of the first amplifier and the second gate switch connecting the light sensitive element to the input of the second amplifier. Preferably, the at least one address switch comprises first and second address switches, the first address switch connecting the output of the first amplifier to the data bus and the second address switch connecting the output of the second differential amplifier to the data bus.

Alternatively, the photosurface comprises a differential amplifier having positive and negative inputs and an output, wherein the output of the first differential amplifier is connected to the positive input of the differential amplifier, the output of the second differential amplifier is connected to the negative input of the differential amplifier and wherein the output of the differential amplifier is connected by the at least one address switch to the data bus.

In preferred embodiments of the invention, these photosurfaces are used in 3D cameras.

Preferably, the 3D camera comprises a controller that gates pixels in the photo surface on and off by controlling at least one of the first and second gate switches of the circuits of the pixels to be closed or open. Preferably, the 3D camera comprises a light source that radiates a plurality of light pulses that illuminate objects in the scene, the light pulses having a pulse width, wherein the controller gates pixels in the photosurface on or off at times responsive to times at which light pulses of the plurality of light pulses are radiated.

In a preferred embodiment of the invention, the controller is operative to:

gate pixels on for a first gate period after a first time lapse following each radiated light pulse of a first plurality of radiated light pulses such that current from the light sensitive element is integrated by the first integrator; and gate pixels on for a second gate period after a second time lapse following each radiated light pulse of a second plurality of radiated light pulses such that current from the light sensitive element is integrated by the second integrator.

Preferably, the mid points of first and second gate periods are delayed with respect to the radiated light pulses that they respectively follow by the same amount of time. Preferably, the duration of the first gate period is substantially equal to the pulse width of the radiated light pulses. Preferably, the duration of the second gate is greater than or equal to three times the pulse width.

Alternatively, in a preferred embodiment of the invention the controller is operative to:

gate pixels on for a first gate period after a first time lapse following each radiated light pulse of the plurality of radiated light pulses such that current from the light sensitive element is integrated by the first integrator; and gate pixels on for a second gate period after a second time lapse following each radiated light pulse of the plurality of the plurality of radiated light pulses such that current from the light sensitive element is integrated by the second integrator.

Preferably, the first time lapse is such that light reflected from the object reaches the light sensitive element during the first gate period, such that current therefrom responsive to background light, light reflected from the radiated light pulse by objects in the scene plus dark current is integrated on the first integrator.

Preferably, the second time lapse is such that light reflected from the object does not reach the light sensitive element during the second gate period, such that current therefrom responsive to background light plus dark current is integrated on the second integrator.

In a preferred embodiment of the invention, the at least one capacitor is connected to the at least one amplifier by a plurality of switches such that:

for a first combination of open and closed switches a first terminal of the at least one capacitor is connected to the input of the amplifier and a second terminal of the at least one capacitor is connected to the output of the amplifier; and for a second combination of open and closed switches the first terminal of the at least one capacitor is connected to the output of the amplifier and the second terminal of the at least one capacitor is connected to the input of the amplifier.

In preferred embodiments of the invention, the above photosurfaces are used in 3D cameras.

In a preferred embodiment of the invention, the 3D camera comprises a controller that gates pixels in the photo surface on and off by controlling the at least one gate switch in the circuits of the pixels to be closed or open. Preferably, the 3D camera comprises a light source that radiates a plurality of light pulses having a pulse width that illuminate objects in the scene and wherein the controller gates pixels in the photosurface on or off at times responsive to times at which light pulses of the plurality of light pulses are radiated.

Preferably, the controller gates pixels on for a first and second gate periods following each light pulse in the plurality of light pulses and wherein during the first gate period current in the light sensitive element is responsive to background light and light of the radiated light pulse reflected from the objects in the scene plus dark current is integrated on the capacitor and increases voltage across the capacitor and wherein during the second gate current responsive to background light plus dark current is integrated on the capacitor and decreases voltage across the capacitor.

Preferably, the duration of the first gate and the duration of the second gate are controlled to be equal to a high degree of accuracy.

Preferably, the duration of the first and second gates is substantially equal to the pulse width of the radiated light pulses.

Preferably, the pixel circuit of the photosurface comprises a reset switch connected to the light sensitive element and wherein when the reset switch is closed, voltage across the light sensitive element is set to a predetermined magnitude. Preferably, the controller controls the reset switch and wherein before the controller gates a pixel on the controller closes and opens the reset switch of the pixel at least once.

In a preferred embodiment of the invention, the at least one variable connection comprises at least one modulator. Preferably, the at least one modulator comprises one modulator and wherein the at least one capacitor comprises one capacitor. Preferably, the at least one modulator is controllable to modulate the current from the light sensitive element harmonically. Alternatively, the at least one modulator is controllable to modulate the current from the light sensitive element pseudo randomly.

In preferred embodiments of the invention, these photosurface are used in a 3D camera.

preferably, the 3D camera comprises a controller that controls modulators in the pixels of the photosurface to modulate currents from the light sensitive elements of the pixels. preferably, the modulators modulate the currents harmonically. In one preferred embodiment of the invention, different pixels of the photosurface are modulated at different frequencies of modulation.

In a preferred embodiment of the invention, the 3D camera comprises a light source that radiates a beam of light having an harmonically modulated intensity and wherein the controller controls the modulators to modulate the currents harmonically so that the beam of light and the currents are modulated harmonically at the same frequency of modulation and in phase.

In a preferred embodiment of the invention, the controller controls each pixel of the pixels in the photosurface independently of other pixels in the photosurface. In an alternative preferred embodiment of the invention, pixels in the photosurface are grouped into different pixel groups and pixels in a same pixel group are controlled by the controller simultaneously and wherein each pixel group is controlled independently of other pixel groups.

There is further provided, in accordance with a preferred embodiment of the invention, a method of removing the effects of background and dark current from a signal generated from a gated reflection of a pulsed source of light reflected from an object, the method comprising;

generating a value based on gating a reflection of a pulsed source of light reflected from an object;

generating a second value based on gating when no reflected light is present; and subtracting the values to form a corrected values.

Preferably, gating of the reflection of the pulsed source is so timed and of such a duration that only a portion of the light from the source reflected from the object is utilized in generating the value.

Alternatively or additionally, gating of the reflection of the pulsed source is so timed and of such a duration that all of the light from the source reflected from the object is utilized in generating the value, such that the value is a normalizing value.

There is further provided, in accordance with a preferred embodiment of the invention, a method of removing the effects of background and dark current from a signal generated from a gated reflection of a pulsed source of light reflected from an object and normalizing the signal, the method comprising;

providing a value in accordance with preferred method described above;

providing a normalizing value generated in accordance with the above method; and normalizing the value utilizing the normalizing value.

The invention will be more clearly understood by reference to the following description of preferred embodiments thereof read in conjunction with the figures attached hereto. In the figures identical structures, elements or parts which appear in more than one figure are labeled with the same numeral in all the figures in which they appear. The figures are listed below and.

BRIEF DESCRIPTION OF FIGURES

DETAILED DESCRIPTION OF PREFERRED EMBODIMENTS

Figure 1A:
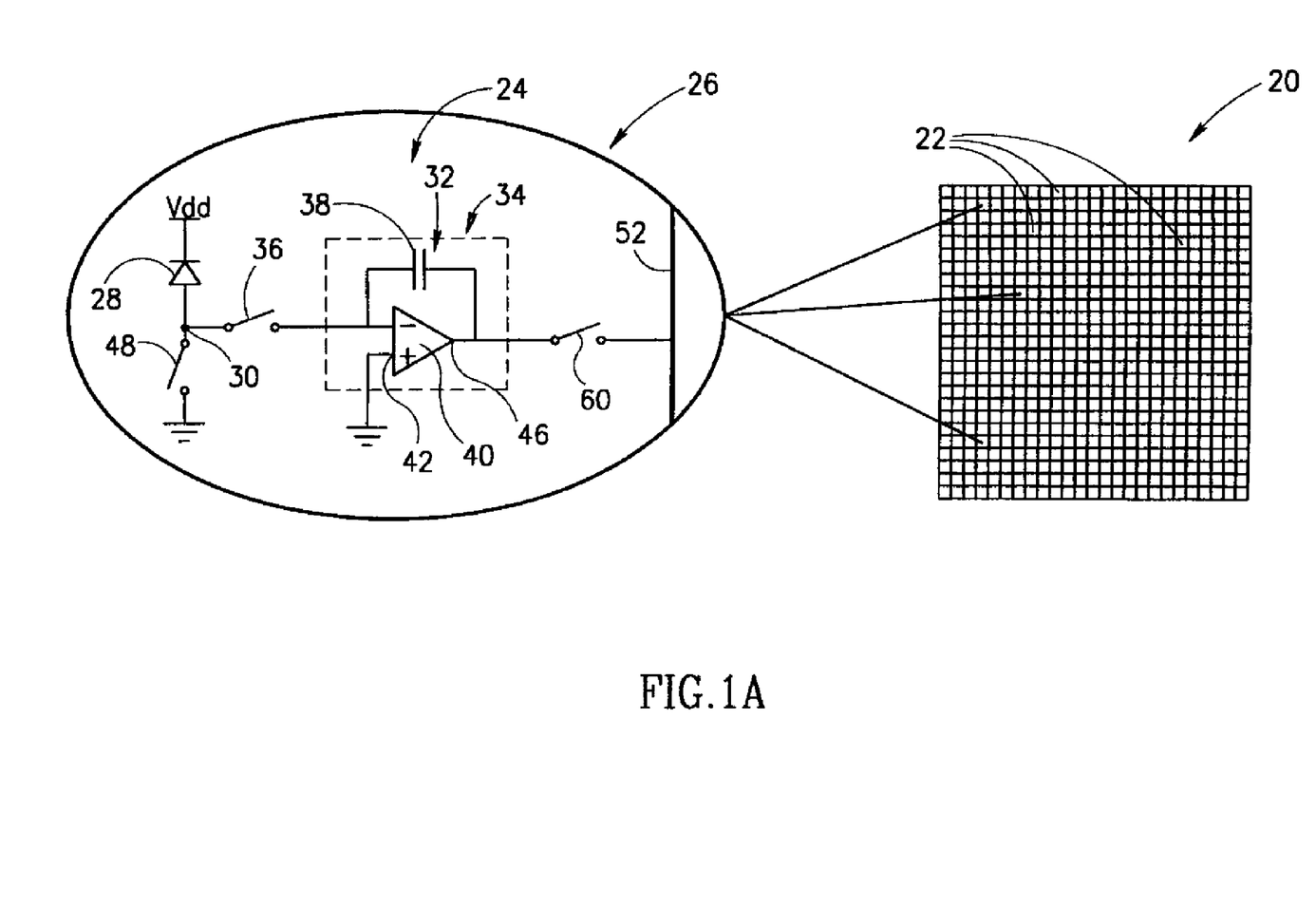
FIG. 1A shows a schematic of a photosurface and a circuit diagram of pixels in the photosurface, in accordance with a preferred embodiment of the present invention.

FIG. 1A shows a schematic of a photosurface 20 for use in a 3D camera in accordance with a preferred embodiment of the present invention. Elements in FIG. 1A, and in similar subsequent figures, are not shown to scale and their relative sizes have been determined for ease and clarity of presentation. Only those parts of photosurface 20 that are relevant to the discussion are shown in FIG. 1.

Photosurface 20 comprises a plurality of pixels 22, wherein each pixel comprises a pixel circuit 24, in accordance with a preferred embodiment of the present invention, shown schematically and in greatly exaggerated scale in inset 26. Pixel circuit 24 comprises a back biased photodiode 28, connected at a node 30 to a variable connection that operates as a gate switch 36. Gate switch 36 connects photodiode 28 to an integrator 32 shown inside a dotted rectangle 34. Integrator 32 comprises a storage capacitor 38 and an amplifier 40 having a positive input 42, a negative input 44 and an output 46. Voltage on output 46 is substantially proportional to charge on capacitor 38. Gate switch 36 connects photodiode 28 to negative input 44 when gate switch 36 is closed and disconnects photodiode 28 from negative input 44 when gate switch 32 is open. Positive input 42 is preferably grounded.

A reset switch 48 selectively connects node 30 to ground. When reset switch 48 is closed any intrinsic capacitance of photodiode 28 is charged to Vdd. When both reset switch 48 and gate switch 36 are closed, any accumulated charge on storage capacitor 38 is discharged and voltage on output 46 is set to zero.

Output 46 of amplifier 40 is connected via an address switch 50 to a readout bus 52. Address switch 50, reset switch 48 and gate switch 36 are controlled to be closed and open by control signals from a controller to which they are connected by control lines (not shown) using methods known in the art. Preferably, the controller and photosensitive surface 20 are integrated on a same substrate (not shown).

In a typical operating cycle of a pixel 22, in accordance with a preferred embodiment of the present invention, when photosurface 20 is used to determine distances to objects in a scene, the pixel is first reset. This is accomplished by closing reset switch 48 and gate switch 36 to discharge storage capacitor 38. Gate switch 36 is then opened. The scene is then illuminated with a train of light pulses, preferably radiated from a pulsed or shuttered laser. Light reflected from each of the radiated light pulses by objects in the scene is collected by collecting optics (not shown) and focused onto photosurface 20. Preferably, an appropriate filter (not shown) that transmits substantially only light having a wavelength radiated by the laser, shields pixels 22 in photosurface 20.

At accurately determined times following the time that each light pulse is radiated, reset switch 48 is opened and gate switch 36 is closed. Gate switch 36 remains closed for an accurately determined period of time and is then opened. Pixel 22 is thereby sensitive to light from the laser during a gate that has an accurately determined gate width (the period of time during which gate switch 36 is closed) and an accurately determined start time following the time that each light pulse is radiated.

If photodiode 28 is exposed to light from a radiated light pulse that is reflected from a region of an object in the scene, and/or background light during the gate, a current, hereinafter referred to as a "photocurrent", flows from photodiode 28 into storage capacitor 38. Storage capacitor 38 integrates the photocurrent and a "photocharge" is accumulated on storage capacitor 38. The photocurrent is proportional to the intensity of the light incident on photodiode 28 from the region of the object and from background light. The amount of photocharge accumulated on storage capacitor 38 is equal to the time integral of the photocurrent during the gate.

By opening and closing reset switch 48 each time before closing gate switch 36 it is assured that every time photodiode 28 is connected to input 44 node 30 has been set to ground and the voltage across the intrinsic capacitance of photodiode 28 is set to Vdd. As a result any change in voltage across the intrinsic capacitance of photodiode 28 that occurs during periods of time between gates does not affect the amount of charge integrated by storage capacitor 38 during a gate. Such changes might result from dark currents or light incident on photodiode during periods between gates.

The total amount of photocharge accumulated by storage capacitor 38 for the train of radiated light pulses is the sum of the photocharges accumulated during all of the gates that follow radiated light pulses in the train of light pulses.

Following the last gate, the amount of photocharge on storage capacitor 38 is determined by closing address switch 50. When this occurs output 46 of amplifier 40 is connected to readout bus 52 and a charge is deposited on readout bus 52 that is proportional to the photocharge accumulated on storage capacitor 38. The charge deposited on readout bus 52 is sensed and registered using methods known in the art.

The registered photocharge from pixel 22 is preferably normalized to the reflectivity of the region of the object imaged on pixel 22 using methods described in PCT Publications WO97/01111, WO97/01112, and WO97/01113 referenced above. Corrected and normalized registered photocharges from a plurality of pixels 22 are then processed to provide distances to objects in the scene and images of the objects as described in the referenced PCT publications.

Following the readout of the photocharge, reset switch 48 and gate switch 36 are closed so as to discharge any accumulated photocharge on storage capacitor 38 and reset the voltage on output 46 to zero. A next operating cycle can now be initiated.

Gate switches 36 and reset switches 48 of pixels 22 on photosurface 20 can be controlled, in accordance with preferred embodiments of the present invention, to gate pixels 22 on and off in different combinations and with different timing sequences. In some preferred embodiments of the present invention gate switch 36 and reset switch 48 of each pixel 22 is controlled independently of gate and reset switches 36 and 48 of other pixels 22. Different combinations of pixels 22 are gated on and off in different timing sequences by controlling individual pixels 22. In other preferred embodiments of the present invention pixels 22 are grouped into different "pixel groups". Gate switch control lines to pixels 22 in a same pixel group are appropriately connected together so that pixels 22 belonging to the pixel group are gated on and off together and different combinations of pixel groups are gated on and off in different timing sequences.

Figure 1B:
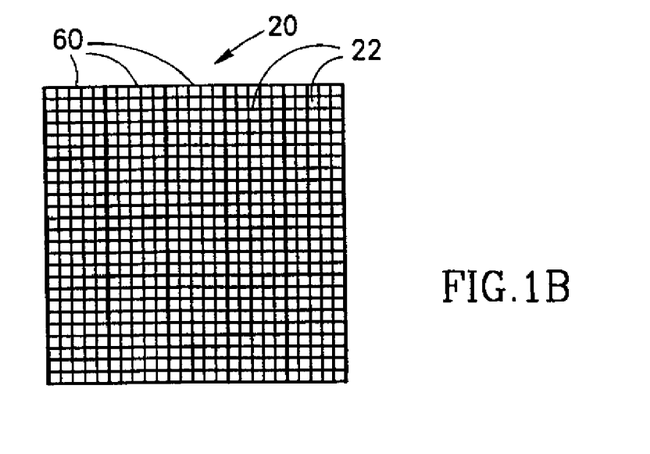
FIG. 1B shows a schematic of a photosurface divided into band shaped pixel groups, in accordance with a preferred embodiment of the present invention.
Figure 1C:
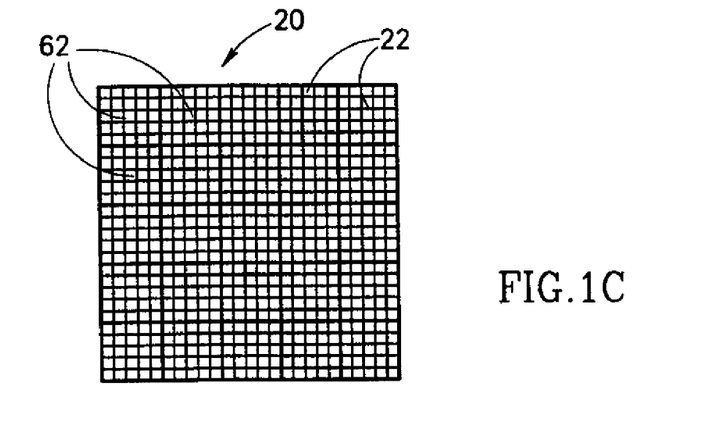
FIG. 1C shows a schematic of a photosurface divided into square shaped pixel groups, in accordance with a preferred embodiment of the present invention.

In some preferred embodiments of the present invention different pixel groups define different regions of photosurface 20. For example, FIG. 1B shows pixel groups that divide photosurface 20 into parallel strips 60. All pixels 22 in a strip 60 belong to the same pixel group and are gated simultaneously. FIG. 1C shows pixel groups that divide photosurface 20 into square substantially equal area regions 62. Applications of different configurations of pixel groups are described in PCT publication WO 97/01111, referenced above.

A photosurface, in accordance with a preferred embodiment of the present invention, may also be divided into pixel groups that are usable to simultaneously provide images of objects in a scene and distance measurements to the objects.

Assume that the scene is illuminated with a train of light pulses and that light reflected from each of the radiated light pulses by objects in the scene is collected by collecting optics and focused onto the photosurface. The photosurface is divided into pixel groups, in accordance with a preferred embodiment of the present invention, in which each pixel group comprises two contiguous pixel sub-groups, a first pixel subgroup and a second pixel sub-group. Each pixel subgroup includes at least one pixel. Preferably, the area of the second pixel subgroup surrounds the area of the first pixel subgroup. Preferably, the pixel groups of the photosurface have small areas.

The first pixel subgroups of the photosurface are used to perform distance measurements to the objects in the scene. The second pixel subgroups of the photosurface are used to provide images of the objects.

In accordance with a preferred embodiment of the present invention the first pixel subgroup of each pixel group is gated on with a relatively short gate at a predetermined time following each light pulse in the train of light pulses (i.e. the pixels of the sub-group are simultaneously gated with a relatively short gate). Preferably, the gate width of the short gate is equal to the pulse width of the light pulses in the train of light pulses. The amount of light registered by a pixel in a first pixel subgroup is a function of the distance from the pixel of a region of an object in the scene that is imaged on the pixel and the intensity of light incident on the pixel from the region. The distance to the region is determined from the amount of light registered on the pixel normalized to the intensity of light incident on the pixel from the region.

The second pixel subgroup of each pixel group is gated on with a relatively long gate at a predetermined time following each light pulse in the train of light pulses. Preferably, the gate width of the long gates is at least three times the pulse width of the light pulses. (In the case where the pulse width and the short gate width are not equal, preferably, the long gate width is equal to at least two pulse widths plus a short gate width). Preferably, the mid points of the long and short gates are substantially coincident. The amount of light collected on a pixel of a second subgroup is a function of the intensity of light incident on the pixel from a region of an object in the scene that is imaged on the pixel.

A region imaged by the first subgroup of a pixel group is contiguous with a region imaged by the second subgroup of the pixel group. The intensity of light registered by pixels in the second subgroup of pixels is used to estimate the intensity of light that is incident on pixels in the first subgroup. Estimates of intensity for pixels in the first pixel subgroup are made from intensities registered on pixels in the second pixel subgroup by appropriate averaging and interpolation techniques known in the art. The estimated intensity of incident light on pixels in the first subgroup is used to normalize the amount of light registered on pixels in the first subgroup in order to determine distances to the objects.

Figure 1D:
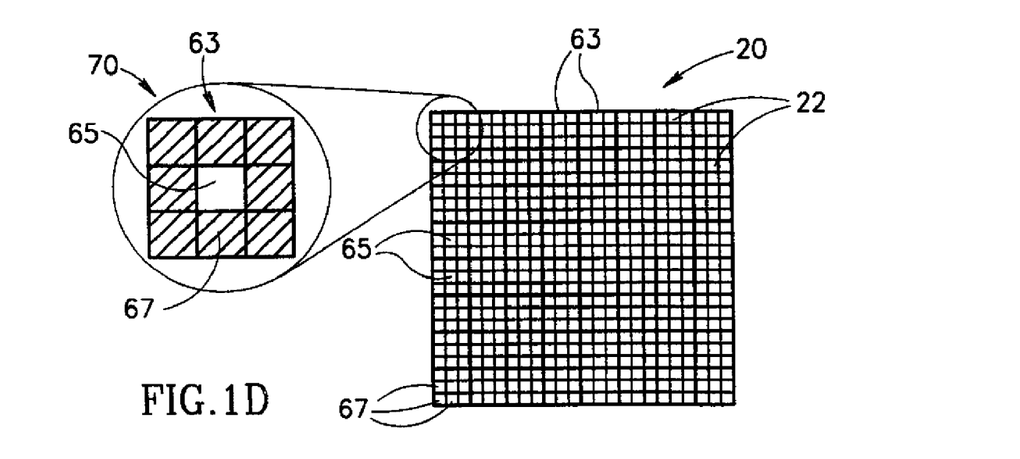
FIG. 1D shows a schematic of a photosurface divided into pixel groups that are used to simultaneously provide an image of a scene and distance measurements to points in the scene, in accordance with a preferred embodiment of the present invention.

FIG. 1D shows photosurface 20 divided into pixel groups 63 that are usable to simultaneously provide an image of an object illuminated by an appropriate train of light pulses and distance measurements to the object, in accordance with a preferred embodiment of the present invention. Each pixel group 63 preferably comprises nine pixels 22. The nine pixels 22 are preferably grouped into a first pixel subgroup 65 comprising a single pixel 22 and a second pixel subgroup 67 comprising eight pixels 22. Inset 70 of FIG. 1D shows a pixel group 63 in which pixels 22 belonging to second subgroup 67 are textured and the single pixel 22 belonging to first pixel subgroup 65 is shown untextured. First pixel subgroup 65 is used for distance measurements to objects in a scene and second pixel subgroup 67 is used for imaging objects in a scene.

Figure 2:
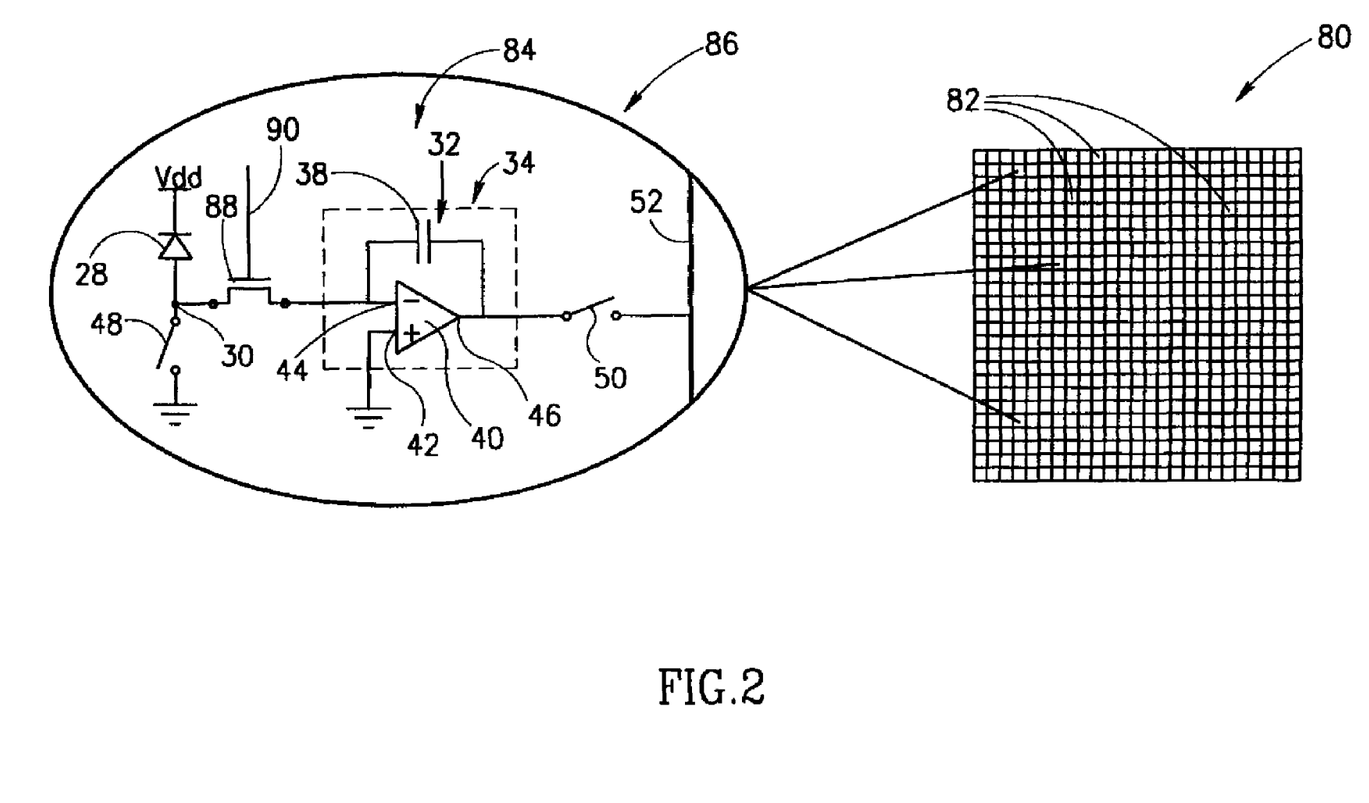
FIG. 2 shows a schematic of a photosurface and a circuit diagram of pixels in the photosurface, in accordance with another preferred embodiment of the present invention, in which the pixel circuit comprises a modulator.

FIG. 2 shows a schematic of a photosurface 80 comprising pixels 82 in accordance with another preferred embodiment of the present invention. Each pixel 82 comprises a pixel circuit 84 shown in inset 86. Pixel circuit 84 is identical to pixel circuit 24 shown in FIG. 1A except that in pixel circuit 84 a modulator 88 replaces gate switch 36 in pixel circuit 24. Modulator 88, unlike gate switch 36, modulates current flowing from photodiode 28 into storage capacitor 38 rather than either just preventing photocurrent from flowing or enabling photocurrent to flow into storage capacitor 38. Modulator 88 is preferably a FET and is shown in FIG. 2 by the graphical symbol for a FET. Modulator 88 is connected by a control line 90 to a controller (not shown) that controls the value of the resistance of modulator 88 between photodiode 28 and input 44 of amplifier 40. The resistance of modulator 88 modulates the magnitude of photocurrent that flows through photodiode 28 into storage capacitor 38.

When pixels 82 in photosurface 80 are modulated harmonically, in accordance with a preferred embodiment of the present invention, photosurface 80 is useable to determine distances to objects using an harmonically modulated light source according to methods described in U.S. Pat. No. 4,935,616 cited above.

For example, assume that a target (not shown) located at a distance D from photosurface 80 is illuminated with laser light that is modulated so that the intensity of the laser light may be written as $I=I_o(1+\sin(\omega t))$. Assume that pixels 82 of photosurface 80 are harmonically modulated, in accordance with a preferred embodiment of the present invention, so that the sensitivity of pixels 82 can be represented by $S=S_o(0.5)(1+\sin(\omega t))$. Assume further that light reflected by the target is properly collected and focused onto photosurface 80 for a period of time equal to NT where N is an integer and $T=2\pi/\omega$, is the period of modulation of the laser light and the pixel sensitivities. Then the amounts of photocharge accumulated on a capacitors 30 of pixels 82, onto which an image of the target is focused, will be proportional to $RI_oS_o(NT)(0.5+0.25\cos\theta)$ where R is a proportionality constant and $\theta=2D\omega/c$ where c is the speed of light. The amplitude, $RI_oS_o(NT)$, can be determined, in accordance with a preferred embodiment of the present invention, by imaging the target with modulated laser light for a known period of time, which period of time is preferably equal to NT, without modulating the sensitivity of pixels 82.

In the above example pixels 82 of photosurface 80 are modulated harmonically. In some preferred embodiments of the present invention pixels are modulated non-harmonically. For example, pixels may be modulated pseudo-randomly.

Figure 3:
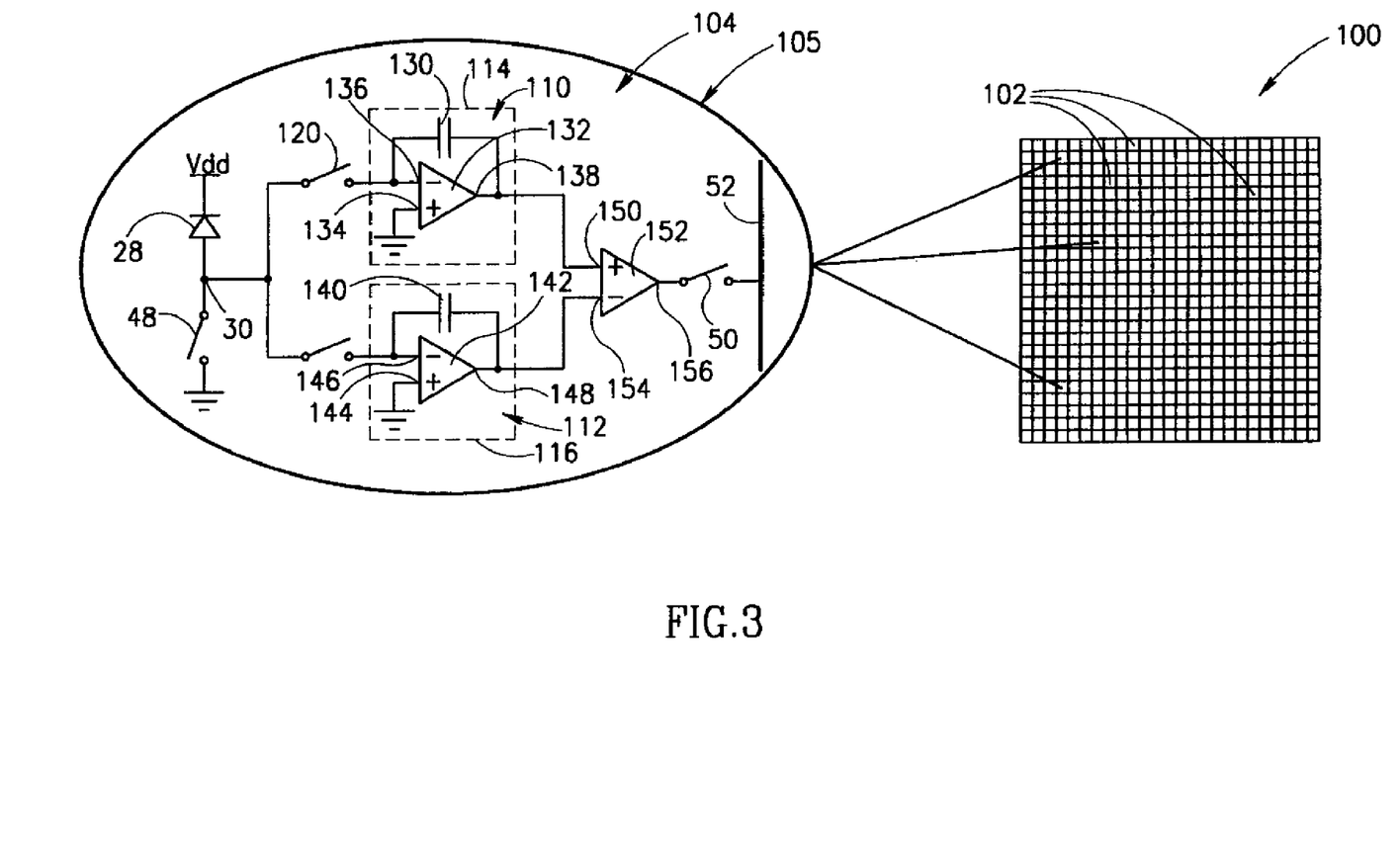
FIG. 3 shows a schematic of a photosurface and a circuit diagram of pixels in the photosurface, in accordance with a preferred embodiment of the present invention, in which pixel outputs are automatically corrected for biases due to background light and dark current.

FIG. 3 shows another photosurface 100 comprising pixels 102 for use in a 3D camera in accordance with a preferred embodiment of the present invention, to determine distances to objects in a scene. Like photosurface 20 shown in FIG. 1A, photosurface 100 is preferably used with a pulsed or shuttered laser and is preferably shielded by an appropriate optical filter that transmits substantially only light having a wavelength equal to that of light radiated by the laser.

However, unlike pixels 22 in photosurface 20, the outputs of pixels 102 in photosurface 100 are automatically corrected for biases caused by background light to which they are exposed and from dark currents. Background light is any light incident on pixels 102 that is not from light radiated to illuminate objects in the scene. Such background light may originate from sources of light (natural as well as man made) other than the laser that radiate light having the same wavelengths as light radiated by the laser. Background light might also arise because the optical filter that shields photosurface 100 might not be perfectly opaque to light having wavelengths not radiated by the laser.

Pixels 102 comprise a pixel circuit 104 shown in greatly exaggerated scale in inset 105. Pixel circuit 104 comprises a photodiode 28 connected to a node 30 and preferably back biased with a voltage Vdd, and first and second integrators 110 and 112 respectively shown inside dotted circles 114 and 116. First and second integrators 110 and 112 are preferably identical and similar in structure and operation to integrator 32 shown in FIG. 1A as part of pixel circuit 24. A first gate switch 120 is used to connect and disconnect photodiode 28 to and from first integrator 110 and a second gate switch 122 is used to connect and disconnect photodiode 28 to and from second integrator 112.

First integrator 110 comprises a first storage capacitor 130 and first amplifier 132, which amplifier 132 has positive and negative inputs 134 and 136 and an output 138. Second integrator 112 has a second storage capacitor 140 and an amplifier 142 having positive and negative inputs 144 and 146 and an output 148. Preferably, integrators 110 and 112 are identical. Output 138 of first integrator 132 is connected to a positive input 150 of an amplifier 152 and output 148 of second amplifier 142 is connected to a negative input 154 of amplifier 152. Amplifier 152 has an output 156. Voltage on output 156 is proportional to the difference of voltages on outputs 138 and 148. This voltage is proportional to the charge generated by reflection from the object of light from the illumination source.

When first gate switch 120 is closed and second gate switch 122 is open, photocurrent from photodiode 28 is integrated by first storage capacitor 130. Similarly, when first gate switch 120 is open and second gate switch 122 is closed, photocurrent from photodiode 28 is integrated by second storage capacitor 140. Node 30 is connected to a reset switch 48. When reset switch 48 is closed the intrinsic capacitance of photodiode 28 is charged to voltage Vdd. When reset switch 48 and gate switch 120 are closed storage capacitor 130 is discharged. Similarly, storage capacitor 140 is discharged when reset switch 48 and gate switch 122 are closed.

Output 156 of differential amplifier 152 is connected via an address switch 50 to a readout bus 52. When address switch 50 is closed, voltage on output 156, which is proportional to the difference between the amounts of photocharge on first and second storage capacitors 130 and 140 respectively, is sensed via on readout bus 52. The sensed voltage is a measure of the intensity of the response of a pixel 102 to light from an object imaged on the pixel 102.

A controller (not shown) controls each of the switches in circuit 100 via appropriate control lines (not shown) that connect the controller to the switches.

When photosurface 100 is used to determine distances to objects in a scene, a train of light pulses radiated from the laser illuminates the scene. Following each light pulse in the train of radiated light pulses, each pixel 102 in photosurface 100 that is used to determine distances to the objects is gated on twice.

The first time a pixel 102 is gated on, for a "first gate", photodiode 102 is connected to first integrator 110 and disconnected from second integrator 112 and photocurrent is integrated on first storage capacitor 130. The second time pixel 102 is gated on, for a "second gate", photodiode 102 is connected to second storage capacitor 140 and disconnected from first capacitor 110 so that photocurrent is integrated on second storage capacitor 140. The gate widths of the first and second gates are controlled to be equal to a high degree of accuracy. Each time before photodiode 28 is connected to one or the other of integrators 110 and 112, reset switch 48 is closed so as to charge the intrinsic capacitance of photodiode 28 to Vdd and set the voltage of node 30 to ground. As explained in the discussion of FIG. 1A this prevents any changes in voltage across the intrinsic capacitance of photodiode 28 that occur between gates from affecting the amounts of charge accumulated on storage capacitors 130 and 140.

The first gate is timed with respect to the radiated light pulse so that pixel 28 accumulates photocharge on first storage capacitor 130 generated by light incident on photodiode 28 that is reflected from the radiated light pulse by an object in the scene. During the first gate, storage capacitor 130 also accumulates photocharge from background light and charge generated by dark current in photodiode 28. The voltage on output 138 of first amplifier 132 is therefore proportional to dark current, photocurrent generated by background light and light reflected by an object in the scene that is integrated during the first gate.

The second gate is timed to follow the first gate after a sufficiently long delay so that light from the radiated light pulse reflected by objects in the scene is no longer incident on pixel 102. During the second gate therefore, pixel 102 accumulates photocharge on second storage capacitor 140 generated only by background light and dark current. The voltage on output 148 of second amplifier 142 is therefore proportional to dark current and photocurrent generated by background light that is integrated during the second gate.

Since the voltage on output 156 of amplifier 152 is proportional to the difference between the voltages on output 138 of first amplifier 132 and output 148 of second amplifier 142, the output of pixel 102 is proportional to photocharge generated only by light that is from the radiated light pulse that is reflected by an object in the scene. Biases in the response of pixel 102 to light resulting from background light and from dark current are substantially removed.

In a variation of pixel circuit 104 amplifier 152 is omitted and each of first and second integrators 110 and 112 respectively is connected to data bus 52 by its own address switch. In this variation of pixel circuit 104, following the last radiated light pulse in the train of light pulses, the voltage on output 138 and 148 of each pixel 102 is separately read out and corrections for the effects of background light and dark current on the output of each pixel 102 is preferably performed digitally.

Figure 4:
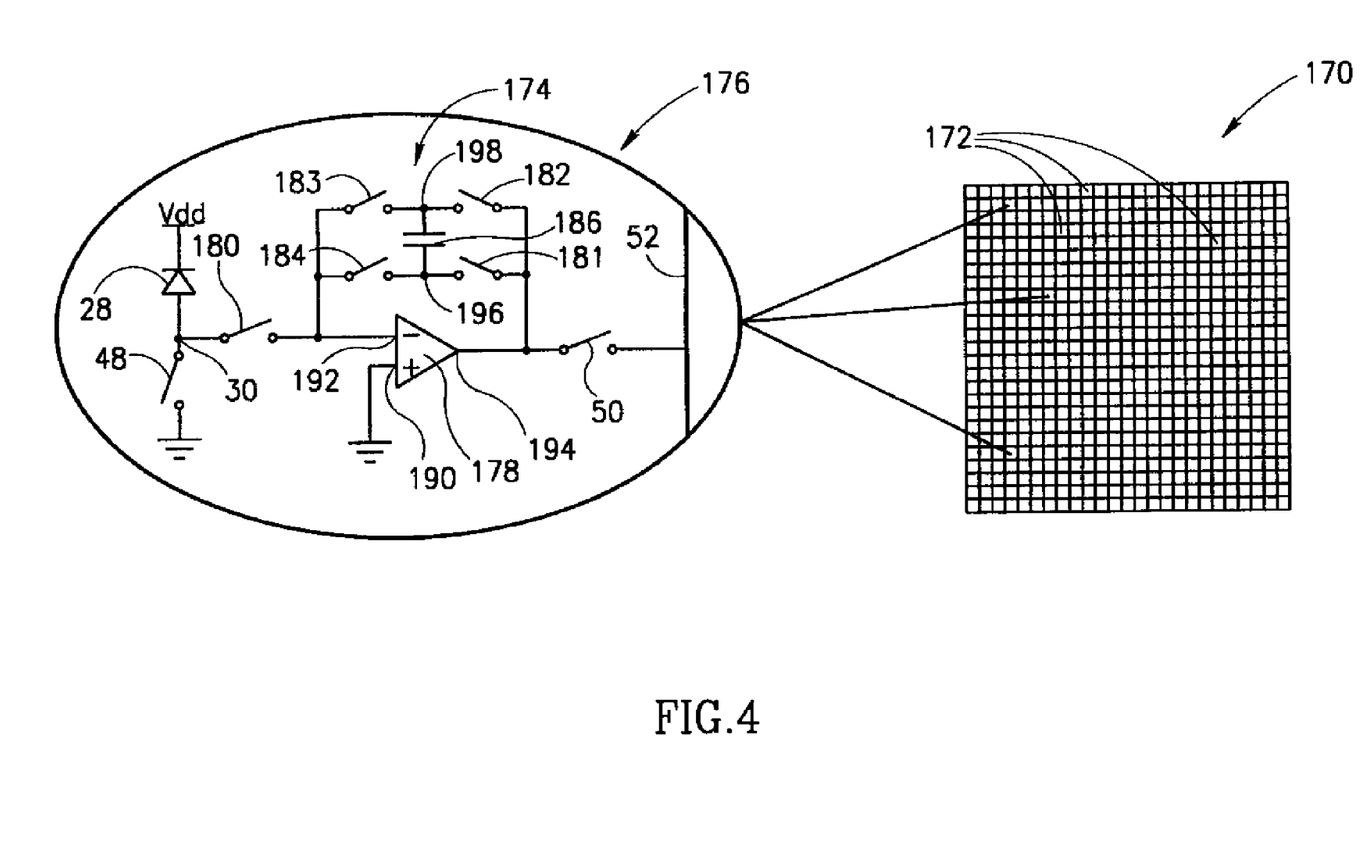
FIG. 4 shows a schematic of another photosurface and a circuit diagram of pixels in the photosurface, in accordance with a preferred embodiment of the present invention, in which pixel outputs are automatically correctable for biases due to background light and dark current.

FIG. 4 schematically shows another photosurface, photosurface 170, comprising pixels 172 wherein each pixel 172 comprises a pixel circuit 174 shown in inset 176 that automatically corrects the output of the pixel for biases causes by background light and dark current in accordance with a preferred embodiment of the present invention. This circuit operates with one capacitor and one amplifier and removes the effects of background light and dark current by switching the direction in which current flows into the capacitor.

Pixel circuit 174 comprises an amplifier 178 and five gate switches, gate switches 180, 181, 182, 183 and 184, which control the operating cycle of pixel circuit 174 and route photocurrent from a photodiode 28 (back biased by voltage Vdd) to a storage capacitor 186. Amplifier 178 has positive and negative inputs 190 and 192 and an output 194. Output 194 can be connected to a readout bus 52 by an address switch 50. Storage capacitor 186 is connected between two nodes, 196 and 198. A reset switch 48 connected to a node 30 is used to ground node 30 and reset the voltage across the intrinsic capacitance of photodiode 28 to Vdd.

Photosurface 170 is useable to measure distances to a target illuminated by a train of light pulses, in accordance with a preferred embodiment of the present invention. Following each light pulse in the train of light pulses, pixels 172 are gated on twice. Each pixel 172 is gated on for a first gate following the light pulse to receive reflected light from the target and subsequently gated on for a second gate to receive background light and measure dark current. The second gate is delayed with respect to the first gate so that during the second gate no reflected light from the target is incident on pixel 172. The gate widths of the two gates are carefully controlled to be equal to a high degree of accuracy. Preferably the gate widths of the two gates are substantially equal to the pulse widths of the light pulses that illuminate the target.

In a typical operating cycle of a pixel 172, capacitor 30 is reset before the first pulse of a train of light pulses illuminating a target by closing gate switches 181 and 182 or gate switches 183 and 184. Thereafter, following each light pulse, reset switch 48 is closed while gate switch 180 is open in order to reset the voltage across the intrinsic capacitance of photodiode 28 to Vdd. Pixel 172 is then gated on for a first gate following (after an appropriate time delay) the light pulse by opening gate switch 48 and closing gate switches 180, 181 and 183. Node 196 is connected thereby to output 194 of amplifier 178 and node 198 is connected to negative input 192 of amplifier 178. During the first gate, photocurrent generated by light reflected by the target and background light, plus dark current, flow into storage capacitor 186 and increase the potential difference across storage capacitor 186. At the end of the first gate, gate switches 180, 181 and 183 are opened and subsequently reset switch 48 is closed to again reset the voltage across the intrinsic capacitance of photodiode 28 to Vdd.

To begin the second gate, reset switch 48 is opened and gate switches 180, 182 and 184 are closed (gate switches 181 and 183 are open). Nodes 196 and 198, which during the first gate were connected to output 194 and input 192 respectively, now have their connections reversed. Node 196 is connected to input 192 and node 198 is connected to output 194. As a result, current from photodiode 28 that flows into storage capacitor 186 during the second gate reduces the voltage across storage capacitor 186. This current is the sum of dark current and photocurrent generated by background light. Therefore at the end of the second gate the contribution to the potential difference across capacitor 186 that existed at the end of the first gate due to dark current and photocurrent generated by background light is subtracted from the voltage across storage capacitor 186. At the end of the second gate, the potential difference across capacitor 186 and the charge accumulated on the capacitor is due only to light reflected by the target from the light pulse.

Voltage on output 194 of amplifier 178 is therefore proportional only to the amount of photocharge generated by light from the train of light pulses that is reflected by the target. The effects of background light and dark current have been effectively eliminated from the output of pixels 172 in photosurface 170. To read the output of pixel 172 following the last pulse of the train of light pulses, gate switch 50 is closed to connect output 194 to readout bus 52.

In order to determine distances to the target the output of each pixel 172 used to measure distance to the target must be normalized to the intensity of the reflected light incident on the pixel from the region of the target that is imaged on the pixel. This is preferably done by grouping pixels 172 in photosurface 170 into pixel groups and using some of the pixel groups to acquire distance data from the target and using other pixel groups to acquire imaging data (intensity data) as described in the discussion of FIG. 1D. Alternatively photosurface 170 may be exposed twice to the target, once to acquire a frame of distance data from the target and a second time to acquire a frame of imaging data from the target. As described above both the distance data and the imaging data are automatically corrected for the effects of background light and dark current. Outputs of pixels 172 that are used to acquire image data from the target are used to normalize outputs of pixels 172 that are used to acquire distance data from the target.

Figure 5:
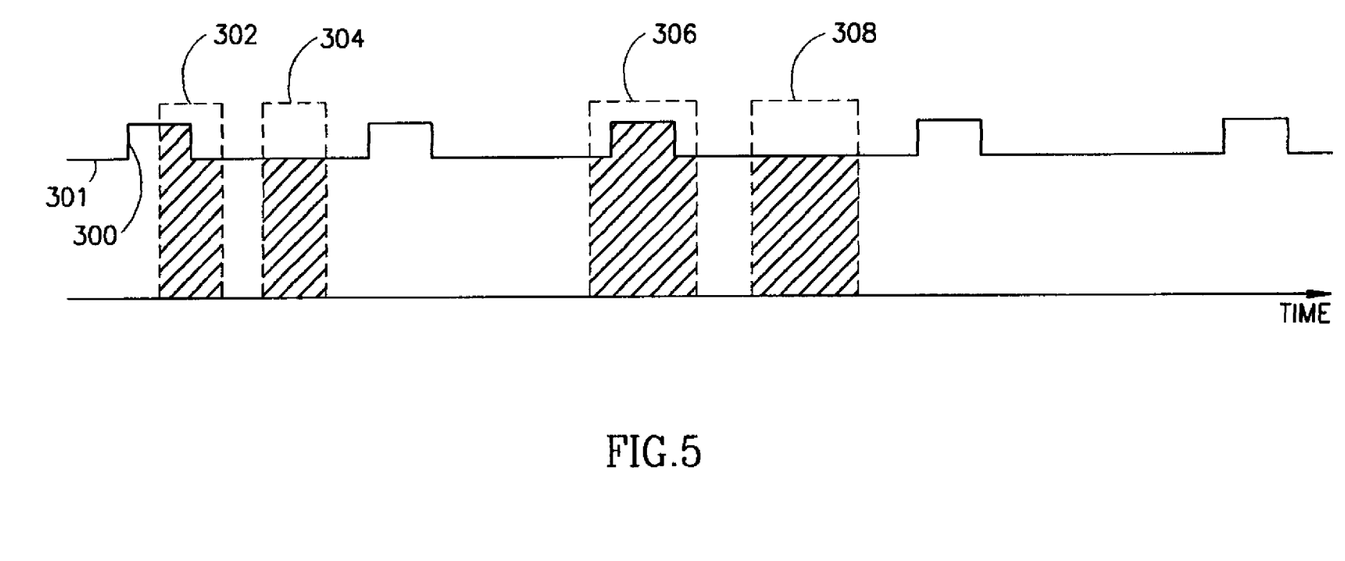
FIG. 5 shows a time drawing of light and gating pulses illustrating a method of removing background and dark current effects for producing normalized light values.

FIG. 5 shows a generalized system for producing normalized, background and dark-current corrected signals, in accordance with a preferred embodiment of the invention. FIG. 5 is a time drawing in which the timing of two pulses and four gates are shown. A background and dark current corrected signal is derived by accumulating charge from a light sensitive device during a first gating period 302. This includes charge generated by source light reflected from the object 300 during (part of) the period as well as charge generated by background light and dark current 301. During a second gating period 304, preferably having the same extent as gate 302, charge which is accumulated is caused only by background and leakage current. The difference between the two shaded areas corresponds to the net charge from the source light reflected from the object. This difference is, however, not yet normalized.

In order to normalize, the total amount of light from source during the entire period of its illumination by the source is accumulated, as in the prior art, during a third gating period 306, which is made long enough to include all of the reflected light 300. As with respect to period 302, the light during this period includes background, source reflection and dark current. During a fourth gate 308, preferably having the same width as gate 306, charge is accumulated which has as its source only background and dark current. When this charge is subtracted from the charge accumulated during period 306, a true normalizing value (net of background and dark current) is determined. This "net" normalizing signal is used to normalize the net source light reflection charge, as determined from the accumulations during gates 302 and 304.

FIG. 5 shows gates 302/304 and 306/308 acquired in pairs on successive pulses. For this case, the charges may be accumulated utilizing for example a circuit such as that shown in FIG. 3 or 4. However, as described above, they may be acquired for the same pulse utilizing different, adjacent pixels or during different frames, in which case the circuit of FIG. 1A may be used. However, it should be understood that the methodology described with respect to FIG. 5 has more general applicability than to the photosurfaces described above and can be utilized in a wider range of pulsed detection systems for the elimination of background and dark current and for normalization.

Figure 6:
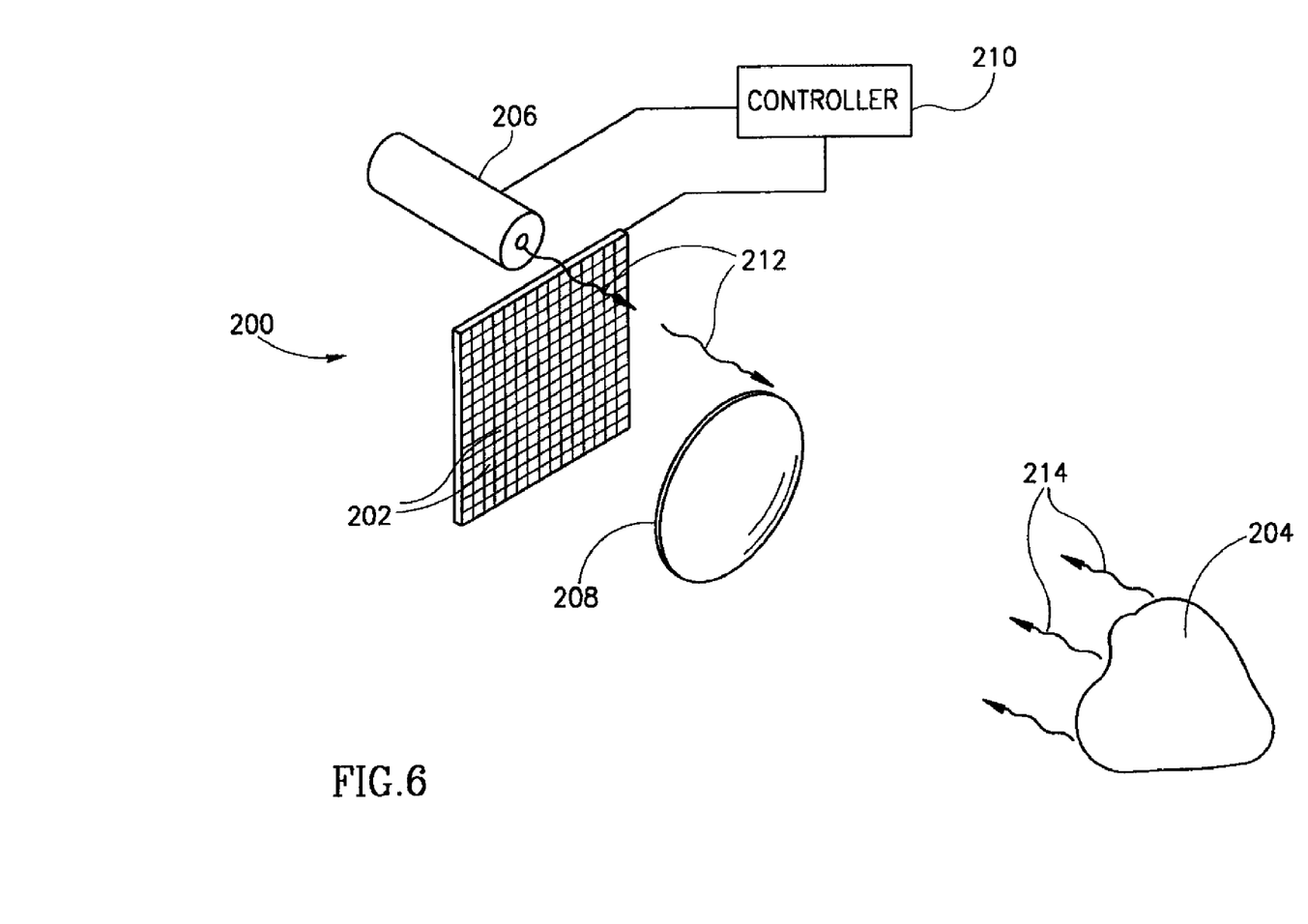
FIG. 6 shows a schematic of a photosurface being used to determine distances to objects in a scene, in accordance with a preferred embodiment of the present invention.

FIG. 6 schematically shows a photosurface 200 having pixels 202 comprised in a 3D camera that is being used to determine distances to an object 204, in accordance with a preferred embodiment of the present invention. Only the parts of the 3D camera that are relevant to the discussion are shown. Elements shown in FIG. 6 are not to scale and their relative dimensions have been chosen to facilitate ease and clarity of exposition.

The 3D camera comprises a light source, preferably a laser 206, that illuminates objects being imaged with a train of light pulses or a light beam having a modulated intensity. A lens 208 collects light from objects imaged by the 3D camera and focuses the collected light on pixels 202 of photosurface 200. 3D camera comprises a controller 210 that synchronizes gating or modulating pixels 202 with light pulses or with the intensity modulation of light radiated by laser 206, respectively.

In the case that laser 206 radiates light pulses, pixels 202 are "gated" pixels that comprise pixel circuits, in accordance with a preferred embodiment of the present invention, of the types shown in FIG. 1A, 3, or 4. Pixels 202 are gated in response to the times at which light pulses are radiated by laser 206, in accordance with a preferred embodiment of the present invention, as described above.

In the case where laser 206 radiates an intensity modulated light beam, pixels 202, are "modulated" pixels that comprise, in accordance with a preferred embodiment of the present invention, pixel circuits of the type shown in FIG. 2. Pixels 202 are modulated in response to the time dependence of the intensity modulation, in accordance with a preferred embodiment of the present invention, as described above.

In FIG. 6 laser 206 is shown illuminating object 204 with a plurality of light pulses represented by wavy arrows 212. Regions of object 204 reflect light from radiated light pulses 212 in reflected light pulses that are represented by wavy arrows 214. Controller 210 gates pixels 202 on and off with respect to the times that light pulses 212 are radiated, pulse widths of light pulses 212, and a range of distances to object 204 that it is desired to measure.

As discussed explicitly for photosurface 24 shown in FIG. 1A, pixels in the other photosurfaces in accordance with preferred embodiments of the present invention that are described above may be gated (or modulated as the case might be) in different combinations and with different timing sequences. Furthermore, pixels may be controlled individually or in groups.

It should also be recognized that different pixels or pixel groups in photosurfaces, in accordance with preferred embodiments of the present invention, may be made sensitive to different wavelengths of light. For example, in some preferred embodiments of the present invention, pixels in a photosurface are grouped into groups of three contiguous pixels in which each pixel is sensitive to a different one of the primary additive colors R, G, B.

Furthermore, whereas preferred embodiments of the present invention are shown comprising a photodiode as an element that generates current in a pixel circuit in response to incident light, other light sensitive current generators, such as photoresistors or photogates may be used instead of the photodiodes shown.

The present invention has been described using non-limiting detailed descriptions of preferred embodiments thereof that are provided by way of example and are not intended to limit the scope of the invention. Variations of embodiments described will occur to persons of the art. The scope of the invention is limited only by the following claims. In the claims, when the words "comprise", "include" or "have" or their conjugations are used they mean "including but not limited to."

The invention claimed is:

1. A 3D camera for determining distances to regions in a scene comprising:
   a photosurface having a plurality of pixels each of which comprises a circuit having a light sensitive element that provides a current responsive to light incident thereon, wherein the circuit comprises,
       at least one amplifier inside each pixel, having an input and an output;
       at least one feedback capacitor separate from the light sensitive element and connected between the input and output of each of the at least one amplifier;
       at least one controllable connection inside each pixel through which the current flows from the light sensitive element into the input of the at least one amplifier;
   a light source; and
   a controller that,
       controls the light source to illuminate the scene with gated light,
       gates or modulates the current from the light sensitive element of each pixel in the photosurface through the at least one controllable connection by opening or closing the at least one controllable connection of each pixel in the photosurface to gate the pixel on and off responsive to the time dependence of the gating or modulation of the light,
       controls the at least one controllable connection to correct for biases caused by at least one of background light or dark current, and
       determines a distance to a region imaged on a pixel responsive to an amount of charge integrated on the at least one feedback capacitor responsive to the gated or modulated current and the corrected biases.

2. A 3D camera according to claim 1, wherein the at least one amplifier is an operational amplifier.

3. A 3D camera according to claim 2, wherein the circuit comprises at least one data bus and wherein the circuit comprises at least one address switch that connects a data bus of the at least one data bus to an output of one of the at least one amplifiers, either directly or via another switch.

4. A 3D camera for determining distances to regions in a scene comprising:
   a photosurface having a plurality of pixels each of which comprises a circuit having a light sensitive element that provides a current responsive to light incident thereon, wherein the circuit for each pixel comprises,
       at least one amplifier inside each pixel, having an input and an output, the at least one amplifier being an operational amplifier;
       at least one feedback capacitor separate from the light sensitive element and connected between the input and output of each of the at least one amplifier;
       at least one controllable connection inside each pixel through which the current flows from the light sensitive element into the input of the at least one amplifier;
   a light source; and
   a controller that,
       controls the light source to illuminate the scene with gated light,
       gates or modulates the current from the light sensitive element of each pixel in the photosurface through the at least one controllable connection responsive to the time dependence of the gating or modulation of the light,
       controls the at least one controllable connection to correct for biases caused by at least one of background light or dark current, and
       determines a distance to a region imaged on a pixel responsive to an amount of charge integrated on the at least one feedback capacitor responsive to the gated or modulated current and the corrected biases;
   wherein the at least one controllable connection comprises at least one gate switch and the controller opens and closes the at least one gate switch to gate the pixel on and off and determines the distance to the region imaged on the pixel responsive to an amount of charge integrated on the at least one feedback capacitor of the at least one amplifier during times at which the pixel is gated on.

5. A 3D camera according to claim 4, wherein the at least one gate switch comprises a single gate switch that connects the light sensitive element to the at least one amplifier.

6. A 3D camera according to claim 4, wherein the circuit comprises a reset switch connected to the light sensitive element and wherein when the reset switch is closed, voltage across the light sensitive element is set to a predetermined magnitude.

7. A 3D camera according to claim 6, wherein before the controller gates the pixel of the photosurface on, the controller closes and opens the reset switch of the pixel at least once so that voltage across the light sensitive element is the same each time the pixel is gated on.

8. A 3D camera according to claim 4, wherein the controller gates at least one pixel in the photosurface independently of other pixels in the photosurface.

9. A 3D camera according to claim 8, wherein pixels in the photosurface are grouped into different pixel groups and pixels in a same pixel group are gated on and off by the controller simultaneously and wherein each pixel group is controlled independently of other pixel groups.

10. A 3D camera according to claim 1, wherein the controller controls the light source to illuminate the scene with a plurality of light pulses, each having a pulse width, and wherein the controller gates the pixels in the photosurface on or off at times coordinated with times at which light pulses of the plurality of light pulses are radiated.

11. A 3D camera according to claim 9, wherein at least one pixel in the same pixel group is used for distance measurements to a region in the scene and at least one pixel in the same pixel group is used for imaging the region in the scene, and wherein the at least one pixel used for distance measurements is different from the at least one pixel used for imaging.

12. A 3D camera for determining distances to regions in a scene comprising:
   a photosurface having a plurality of pixels each of which comprises a circuit having a light sensitive element that provides a current responsive to light incident thereon, wherein the circuit for each pixel comprises,
       at least one amplifier having an input and an output;
       at least one feedback capacitor separate from the light sensitive element and connected between the input and output of each of the at least one amplifier;

at least one controllable connection through which current flows from the light sensitive element into the input of the at least one amplifier;

a light source; and a controller that, controls the light source to illuminate the scene with gated light, opens and closes the at least one controllable connection of a pixel in the photosurface to gate the pixel on and off, controls the at least one controllable connection of the pixel to correct for biases caused by at least one of background light or dark current, and determines a distance to a region imaged on the pixel responsive to an amount of charge integrated on the at least one feedback capacitor during times when the pixel is gated on.

* * * * *